United States Patent
Crawford

(10) Patent No.: US 10,502,161 B2
(45) Date of Patent: Dec. 10, 2019

(54) CASCADE SYSTEM AND APPARATUS

(71) Applicant: Rohr, Inc., Chula Vista, CA (US)

(72) Inventor: Sara C. Crawford, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 789 days.

(21) Appl. No.: 14/954,570

(22) Filed: Nov. 30, 2015

(65) Prior Publication Data

US 2016/0146156 A1    May 26, 2016

Related U.S. Application Data

(63) Continuation-in-part of application No. PCT/US2015/025418, filed on Apr. 10, 2015.

(60) Provisional application No. 61/978,616, filed on Apr. 11, 2014.

(51) Int. Cl.
*F02K 1/72* (2006.01)
*F02K 1/70* (2006.01)
*F02K 1/64* (2006.01)

(52) U.S. Cl.
CPC ............... *F02K 1/72* (2013.01); *F02K 1/64* (2013.01); *F02K 1/70* (2013.01); *F05D 2250/37* (2013.01)

(58) Field of Classification Search
CPC ............... F02K 1/70; F02K 1/72; F02K 1/64
See application file for complete search history.

(56) References Cited

U.S. PATENT DOCUMENTS

| 3,981,451 A | * | 9/1976 | Prior | F02K 1/72 239/265.31 |
| 4,807,434 A | * | 2/1989 | Jurich | F02K 1/72 239/265.29 |
| 6,256,980 B1 | | 7/2001 | Lecordix et al. | |
| 6,546,715 B1 | * | 4/2003 | Blevins | F02K 1/566 239/265.29 |
| 2013/0032642 A1 | * | 2/2013 | Bensilum | F02K 1/72 239/127.1 |
| 2014/0027536 A1 | | 1/2014 | Gormley | |
| 2014/0030057 A1 | | 1/2014 | Gormley | |

OTHER PUBLICATIONS

International Preliminary Report on Patentability dated Oct. 12, 2016 in Application No. PCT/US2015/025418.
International Search Report and Written Opinion dated Dec. 29, 2015 in Application No. PCT/US2015/025418.
European Patent Office, European Office Action dated Dec. 20, 2017 in Application No. 15814457.6-1607.

* cited by examiner

*Primary Examiner* — Craig Kim
*Assistant Examiner* — Katheryn A Malatek
(74) *Attorney, Agent, or Firm* — Snell & Wilmer, L.L.P.

(57) ABSTRACT

A thrust reverser system may comprise a cascade radially positioned about a centerline of an engine or a nacelle centerline. Various cascade features may be positioned at a constant radius from the centerline while other features vary according to station and/or circumferential position.

4 Claims, 4 Drawing Sheets

CASCADE SYSTEM AND APPARATUS

CROSS REFERENCE TO RELATED APPLICATIONS

This application is a Continuation-In-Part that claims priority to and the benefit of PCT Patent Application Serial No. PCT/US15/25418, filed Apr. 10, 2015 and entitled "VARIABLE PROFILE CASCADE," which claims priority to and the benefit of U.S. Provisional Application Ser. No. 61/978,616, filed Apr. 11, 2014 and entitled VARIABLE PROFILE CASCADE SYSTEM AND APPARATUS, both of which are hereby incorporated by reference in their entirety for any purpose.

FIELD

The present disclosure relates to thrust reverser cascades.

BACKGROUND

Typical aircraft engines and/or nacelles generally comprise a thrust reverser system. The thrust reverser system may be configured to provide reverse thrust to slow the aircraft during a landing event, typically after touchdown, by at least partially redirecting the flow of air in the bypass air duct in the forward direction of the aircraft. One type of thrust reverser design includes cascades which help redirect the air from the fan duct in a reverse thrust direction during thrust reverser operation. In some cases, the need to maintain advantageous external loft lines for the nacelle and internal loft lines for the bypass duct make it difficult to fit an aerodynamically well-designed cascade structure inside of its space claim in the nacelle. The following invention helps to improve the cascade's ability to fit inside of a constrained space claim while maintaining performance.

SUMMARY

A thrust reverser system formed around an engine centerline is provided. The thrust reverser system may comprise a torque box, an aft cascade ring, and a cascade. The cascade may have a first vane set and a second vane set. The cascade may be coupled to the torque box and the aft cascade ring. The first vane set may be positioned at a constant radius from the engine centerline. The second vane set may have a radial position from the engine centerline that varies according to its axial position and circumferential position relative to the engine centerline.

In various embodiments, a thrust reverser system may comprise a torque box, an aft cascade ring, a cascade, and a translating sleeve. The aft cascade ring may be aft the torque box. The cascade may have a first vane set and a second vane set. The cascade may be coupled to the torque box and the aft cascade ring. The translating sleeve may be configured to translate aft in response to an event to expose the cascade.

In various embodiments, a thrust reverser cascade may comprise a forward attachment portion, a first plurality of vanes, a second plurality of vanes and an aft attachment portion. The first plurality of vanes may have a first box depth. The first plurality of vanes may be operatively coupled to the forward attachment portion. The second plurality of vanes may have a second box depth. The second plurality of vanes may be operatively coupled to the first plurality of vanes. The aft attachment portion operatively may be coupled to the second plurality of vanes.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
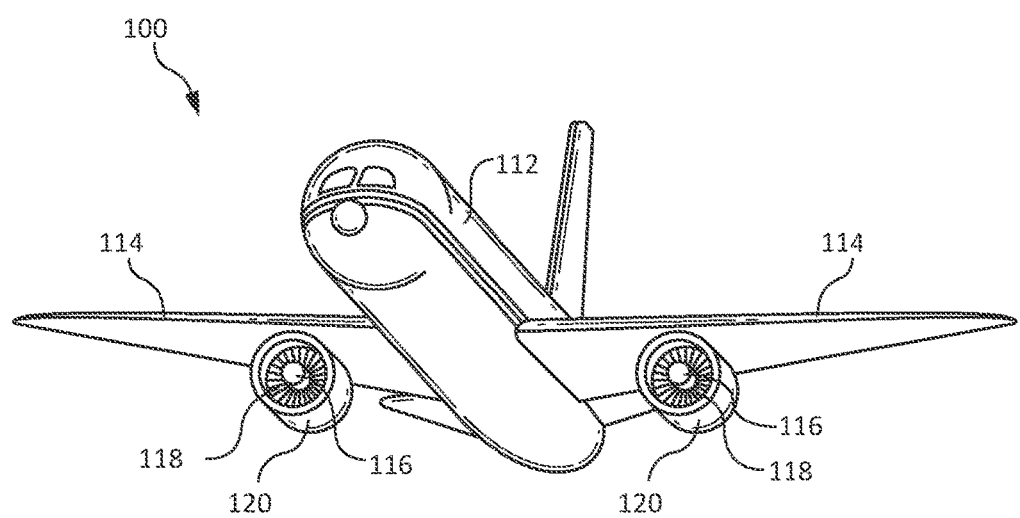
FIG. 1 illustrates a perspective view of an aircraft, in accordance with various embodiments.

In various embodiments and with reference to FIG. 1, an aircraft 100 may comprise a fuselage 112 and a pair of wings 114. Propulsion system 120 (e.g., turbofan jet engine with a nacelle assembly) may be mounted on the underside of wing 114. Propulsion system 120 may be configured to provide forward thrust and/or propulsion for aircraft 100.

In various embodiments, propulsion system 120 may comprise an engine including a fan 118 and an engine core 116, housed within a nacelle assembly. The typical nacelle assembly, or more simply a nacelle, may comprise an inlet, a fan cowl, a thrust reverser, and an exhaust system. The nacelle surrounds the engine core 116 providing smooth aerodynamic surfaces for airflow around and into the engine. The nacelle also helps define a bypass air duct through propulsion system 120.

In various embodiments, fan 118 may draw and direct a flow of air into and through propulsion system 120. After fan 118, the air is divided into two principal flow paths, one flow path through engine core 116, and another flow path through a bypass air duct. The engine core flow path is directed into engine core 116 and initially passes through a compressor that increases the air flow pressure, and then through a combustor where the air is mixed with fuel and ignited. The combustion of the fuel and air mixture causes a series of turbine blades at the rear of engine core 116 to rotate, and to drive the engine's rotor and fan. The high-pressure exhaust gases from the combustion of the fuel and air mixture are thereafter directed through an exhaust system aft of the engine for thrust.

Figure 2:
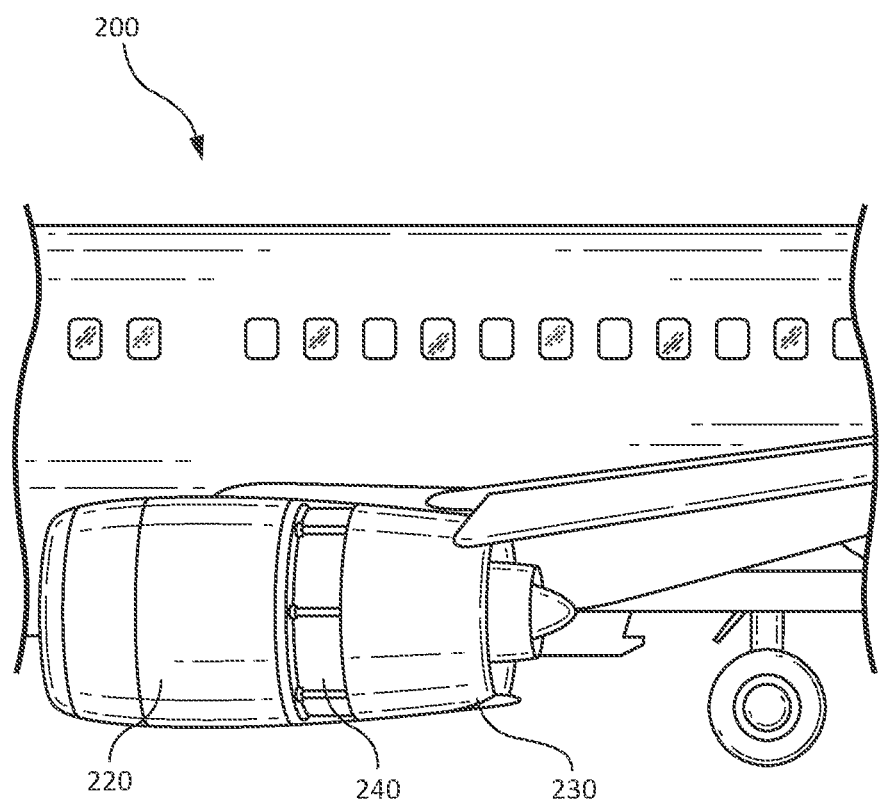
FIG. 2 illustrates a thrust reverser in the deployed position, in accordance with various embodiments.

In various embodiments and with reference to FIG. 2, a thrust reverser system of aircraft 200 may comprise a translating sleeve 230 and a cascade 240. The thrust reverser system may also comprise an air diversion system that is configured to direct airflow in the bypass duct through the cascade to create reverse thrust. The air diversion system may be any suitable system including for example, blocker doors, diversion doors, and/or the like.

Figure 3:
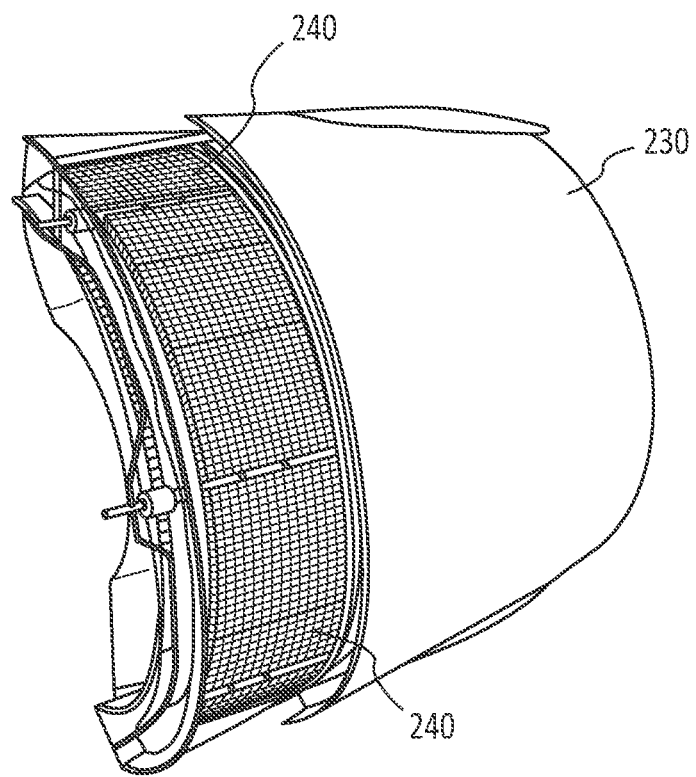
FIG. 3 illustrates a close-up perspective view of the thrust reverser of FIG. 2 in a deployed position.

With reference to FIG. 3, in operation translating sleeve 230 may translate and/or move aft, separating from a fan cowl 220 in response to an event (e.g., a landing, touch down, activation of the thrust reverser system manually or automatically, and/or the like). The movement aft of translating sleeve 230 may expose cascade 240 allow air to be diverted through cascade 240 and directed forward to create reverse thrust. As is known in this art, in the stowed position of the thrust reverser, the cascade 240 may be housed between an inner and an outer panel of the translating sleeve 230 which define a generally annular-shaped pocket between them.

Figure 4:
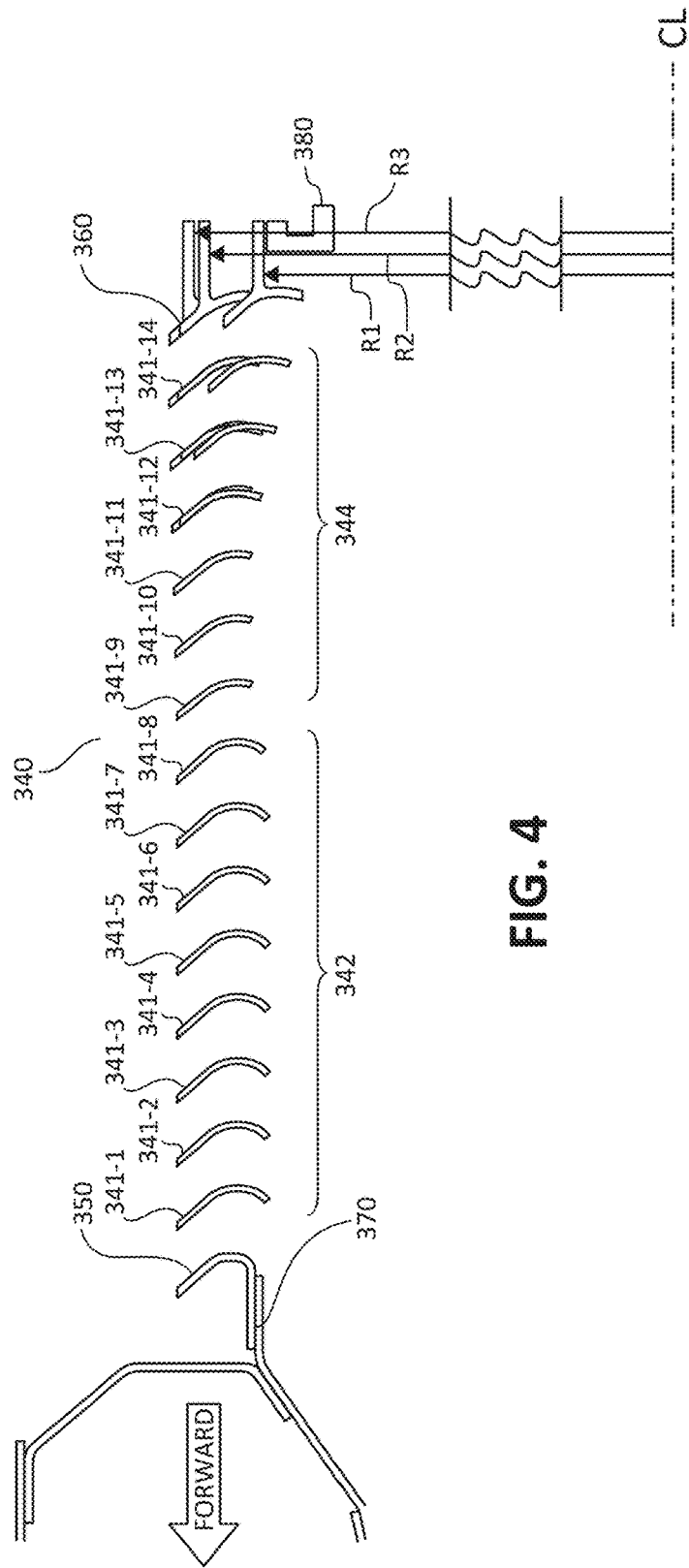
FIG. 4 illustrates several radial cross-sectional views of a thrust reverser cascade and supporting structure, in accordance with various embodiments.

In various embodiments and with reference to FIG. 4, cascade 340 may comprise a forward attachment 350 and an aft attachment 360. Cascade 340 may also comprise a plurality of cascade vanes 341 (shown as vane 341-1, vane 341-2, vane 341-3, vane 341-4, vane 341-5, vane 341-6, vane 341-7, vane 341-8, vane 341-9, vane 341-10, vane 341-11, vane 341-12, vane 341-13, and vane 341-14). The plurality of vanes 341 may be distributed between forward attachment 350 and aft attachment 360.

In various embodiments, forward attachment 350 may couple to and/or attach to a torque box 370. Forward attachment 350 may be coupled to torque box 370 in any suitable fashion, including, for example, with fasteners (e.g., bolts, screws, and/or the like). Aft attachment 360 may be coupled to the aft cascade ring 380. Aft cascade ring 380 may be any suitable hoop structure configured to support the aft portion of cascade 340 and attach to aft attachment 360. Moreover, aft attachment 360 may couple to aft cascade ring 380 in any suitable fashion, including, for example, by a fastener (e.g., a nut and bolt, a screw, and/or the like).

In various embodiments and with reference to FIG. 4, cascade 340 may comprise a first vane set 342 near a forward portion of cascade 340 and a second vane set 344 near an aft portion of cascade 340. The illustration in FIG. 4 represents a composite of several diagrammatical sectional views of cascade 340 taken at different circumferential positions. For example, the radial sectional views may be shown at about the two o'clock position, about the four o'clock position overlaid on the first view, and about the five o'clock position overlaid on the first and second views. This overlay of views illustrates the change in geometry of the cascade 340 between different circumferential positions. Forward attachment 350 may have a constant radius at all circumferential locations, in other words it does not vary and maintains a set radial distance from an engine centerline CL or nacelle centerline at generally all circumferential locations. Likewise, the first vane set 342 features a constant radius at all circumferential positions. However, the radius of the aft attachment 360 at the aft cascade ring may vary according to the circumferential position of cascade 340. For example, at a first circumferential position, the aft attachment may couple to the aft cascade ring at a first radius R1 from the engine centerline CL or the nacelle centerline. At a second circumferential position, aft attachment 360 may couple to the aft cascade ring at a radius R2. At a third circumferential position, aft attachment 360 may couple to the aft cascade ring at radius R3. The second vane set 344 creates a transition between the constant radius vanes in first vane set 342 and the variable radius aft attachment 360.

The varying radius of the aft attachment 360 allows the cascade 340 to fit into a confined, non-cylindrical space claim in the thrust reverser. If the generally annularly-shaped pocket between the inner and outer panel of the translating sleeve is not perfectly annular, but instead moves radially in and out depending upon the station (i.e. the axial position relative to the centerline) and the circumferential position, the varying radius of the aft attachment 360 allows the cascade 340 to fit in such a space. While the constant radius of the forward attachment 350 facilitates design and manufacture of a simpler and reliable interface between the cascade 340 and the torque box.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser system formed around an engine centerline, comprising:
   a torque box;
   an aft cascade ring disposed aft of the torque box;
   a cascade having a first vane set and a second vane set, the first vane set having a fore end connected to the torque box, an aft end disposed aft of the fore end at an axial position and a radial position with respect to the engine centerline, and a first axial length extending between the fore end and the aft end of the first vane set, the first vane set positioned at a constant radius from the engine centerline along the first axial length and
   the second vane set having an aft end connected to the aft cascade ring, a fore end disposed at the axial position and the radial position of the aft end of the first vane set, and a second axial length extending between the fore end and the aft end of the second vane set, the second vane set positioned at a variable radius, from the engine centerline to a radially inward side of the second vane set, along the second axial length and varies about a circumferential position relative to the engine centerline, the variable radius decreasing in value from the fore end of the second vane set to the aft end of the second vane set.

2. The thrust reverser system of claim 1, further comprising a translating sleeve comprising a non-uniform annularly shaped pocket, wherein the cascade is receivable within the non-uniform annularly shaped pocket in response to the translating sleeve assuming a stowed position.

3. The thrust reverser system of claim 1, wherein the torque box has a substantially constant radius relative to the engine centerline.

4. The thrust reverser system of claim 1, wherein the aft cascade ring has a variable radius relative to the engine centerline.

* * * * *